Patented Apr. 21, 1936

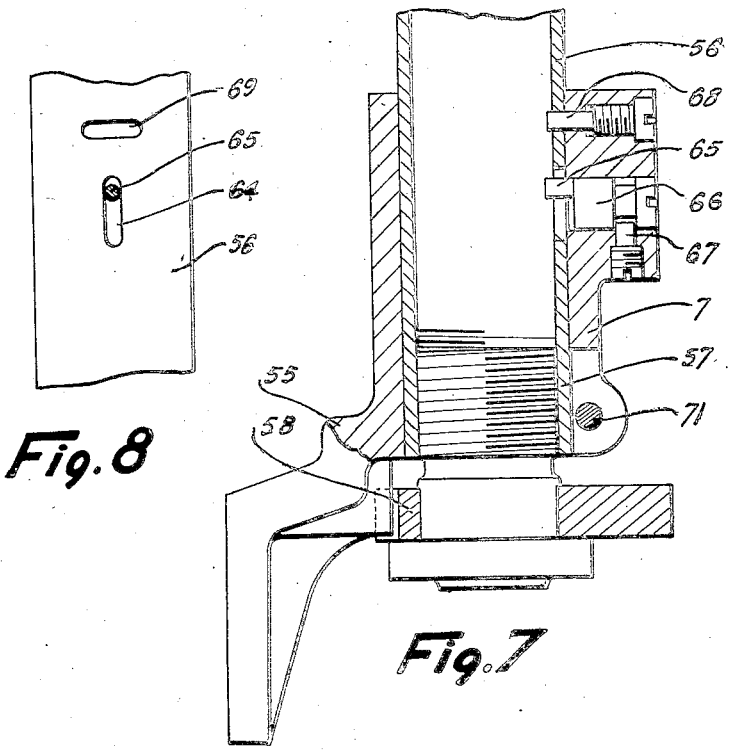
Fig. 8
Fig. 7
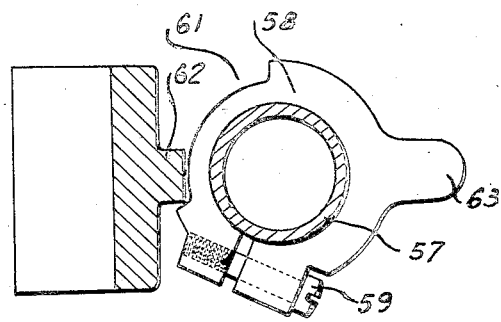
Fig. 9

2,037,854

UNITED STATES PATENT OFFICE 2,037,854

SOUND READER FOR SOUND FILM PROJECTORS

André Léon Victor Clément Debrie, Paris, France

Application December 11, 1934, Serial No. 757,059
In France October 27, 1934

6 Claims. (Cl. 179—100.3)

My invention has for its object improvements in sound readers for sound film projecting machines.

According to my invention all the parts of the sound reader are carried by a single support removably secured after the manner of a lid to the frame of the machine whereby the whole sound reader forms a single unit adapted to be set on and removed from the machine without any difficulty.

In particular this support forms at least a portion of a shield adapted to protect the photoelectric cell from all external influences.

In order to further the connection between the sound reader and any other part of the machine such as an amplifier or the like without it being necessary to establish these connections inside the machine, I provide pins electrically connected with the sockets receiving the pins of the photoelectric cell and arranged on the lower surface of the support which at its lower part forms a metal cage.

With a view to making the film progress in a regular manner in spite of the irregular traction exerted on it, there is provided a fly wheel system over which it passes and which is adapted to rotate, over a roller bearing carrying it, round a pivot integral with the support.

At the place where the sound is being read, the film is applied against its channel by a rocking shoe acting on the sides of the film and the pressure of which is adjustable. The mounting of this shoe is such as will allow its easy removal.

Lastly I have provided suitable means for providing adjustment of the optic sound reader both longitudinally of the optic axis in accordance with the side impressed or unimpressed which is applied against the channel and angularly round said optic axis.

A form of execution of a machine including the above improvements is described hereinbelow by way of example and shown in accompanying drawings.

Fig. 7 is a longitudinal cross-section of the optic part of the sound reader.

Fig. 8 is an explanatory side view of a detail thereof.

Fig. 9 is an explanatory plan view of another detail thereof.

Figure 1:
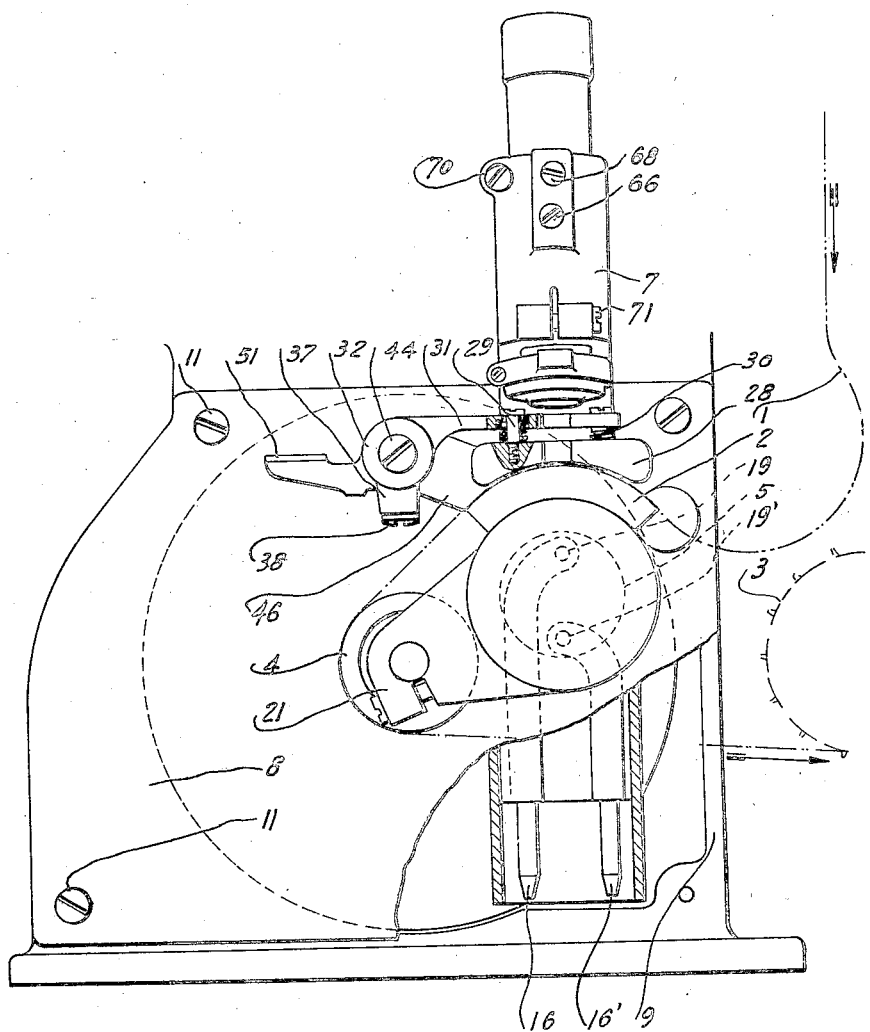
Fig. 1 shows the sound reader seen vertically.

I have only shown, of the whole machine, the sound reader comprising the usual incurved channel 2 over which the film 1 passes as it comes from the projecting channel; said film is drawn by the toothed drum 3 over the ring or pulley 4 adapted to make its progress more regular. The reading is performed in the incurved channel through the agency of the photoelectric cell 5 on which light may fall through the slot 6 from the optic system 7 used for sound reading.

It is apparent that all these parts are carried by the support 8 fitted after the manner of a cover on the frame 9 of the machine through the screws 11. I may thus set in place and remove the sound reader as a unit. The support 8 is provided with a cylindrical metal part 12 forming a cage for isolating the photoelectric cell 5 from external disturbances and for avoiding the radiation from the transformers and the currents induced through the projector motor and the amplifier system. A removable cap 13 provided with a guiding ring 14 completes the protection of the photoelectric cell.

Figure 2:
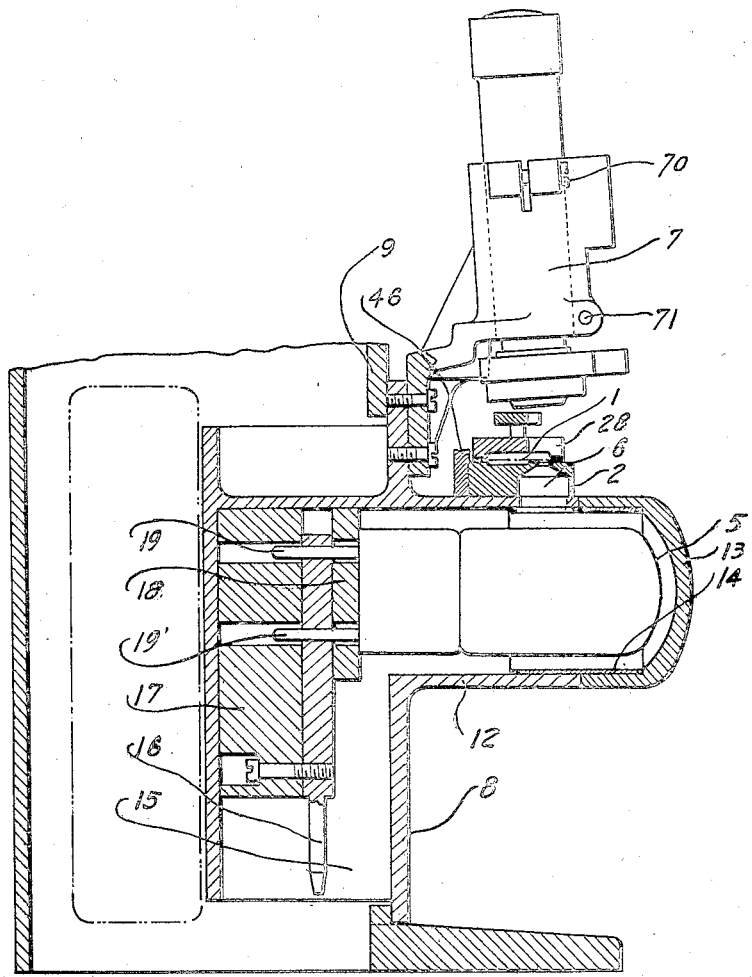
Fig. 2 is a cross-section through the axis of the photoelectric cell.

The support 8 comprises on the other hand, at its rear end a recess 15 (Fig. 2) in which are housed the contact pins 16, 16' (Figs. 1 and 2) surrounded by a metallic protecting wall so as to remove the above-mentioned detrimental effects and held (Fig. 2) between insulating plates 17, 18. These pins are electrically connected as shown in Fig. 1 with the sockets adapted to receive the pins 19, 19' of the cap of the photoelectric cell. It is thus apparent that for connecting the photoelectric cell with any other part of the machine, it is sufficient to engage the pins 16, 16' in suitable sockets without it being necessary to execute any difficult connections.

Figure 3:
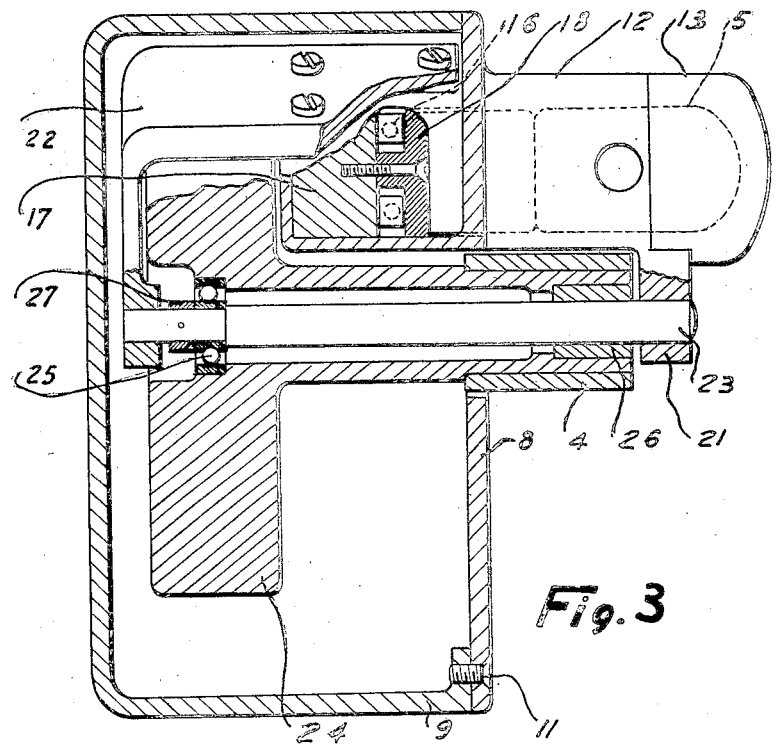
Fig. 3 is a plan view partly sectional.

A lug 21 (Fig. 3) of the support 8 and a square 22 secured to the said support carry a stationary spindle 23 round which may rotate the flywheel system 24 with the interposition of a ball bearing 25 supporting the entire weight of the fly-wheel 24. To the fly-wheel 24 are rigidly secured a sleeve 26 rotatably mounted on the spindle 23 and supporting a very small load and an annular pulley 4 over which the film 1 passes. This fly-wheel system provides perfect regularity of progress for the film, without any jerks or vibrations, in spite of the irregular traction which may be exerted by the drum 3.

A thrust ring 27 keyed to the spindle 23 keeps the fly-wheel system 24 in its correct longitudinal position.

It is of vital interest for the film 1 to be held rigidly in the incurved channel 2 and for its oscillations under the action of its step by step progress used for picture projection to be damped.

Figures 4, 5:
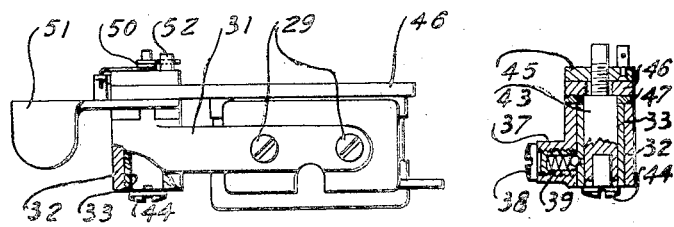
Figs. 4, 5, 6 are perspective views of details relating to the mounting of the presser shoe.
Figure 6:
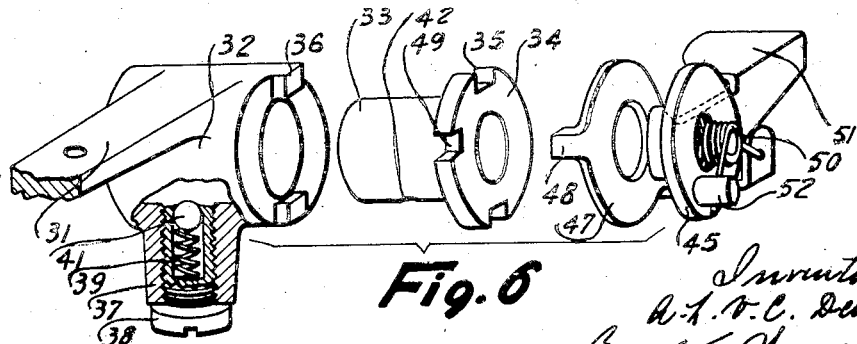

To this end I use a presser constituted by a shoe 28 pushed towards the channel 2 by coil springs 30 surrounding the screws 29 which allow the shoe to rock in all directions. The screws 29 are secured to a lever 31 integral with or rigidly secured to a ring 32 (see Figs. 1, 4, 5, 6). The ring 32 is fitted over another ring 33 provided with a flange 34 having notches 35 engaged by teeth 36 provided laterally at the periphery of the ring 32. The latter is further provided with a threaded socket 37 (Fig. 5) engaged by a hollow screw 38 in which is housed a spring 39. This spring urges a ball 41 into a recess 42 in the ring 33 so as to prevent any relative motion between the two rings 32 and 33. The ring 33 is in its turn fitted over a spindle 43 (Fig. 5) round which it may rotate but with reference to which it is held longitudinally by the screw 44.

The spindle 43 is provided with a threaded part over which a nut 45 is screwed which bolts the spindle 43 against a stationary lateral flange 46 integral with or rigidly secured to the incurved channel 2 (see also Fig. 1).

Between the nut 45 and the flange 34 of the ring 33 is arranged a washer 47 provided on one hand with a projection 48 engaging a notch 49 in the flange 34 of the ring 33 and on the other hand with hand-controllable lever 51.

Lastly the nut 45 is provided with a stud 52 acting as a stop for the spring 50 wound over the spindle 43 and the end of which is secured to the lever 51.

When it is desired to set the film in place in its channel 2, I depress the lever 51 which moves, through the projection 48, the ring 33 and the teeth 36, the ring 32, the lever 31 and the shoe 28; this uncovers the channel and allows the introduction of the film in it.

When it is desired to dismantle the presser, it is sufficient to exert a forward traction on the lever 31. This lever will move with its ring 32 off the ring 33 which is held on the spindle 43 by the screws 44. When reinserting the presser system the reengagement of the ball 41 with the recess 42 ensures a correct relative positioning of the rings 32 and 33.

It will be noticed (Fig. 2) that the shoe 28 bears only against the sides of the film. For a proper lateral guidance, I may arrange on the channel a second flange opposite flange 46.

In order to adjust the pressure of the shoe, it is sufficient to place the stud 52 in a different angular position with reference to the spindle 43, by acting on the nut 45 carrying said stud. This will modify the torsional stress of the spring 50.

I will now disclose the two adjusting means for the optic sound reader 7.

According as to whether the film rests on its channel through its emulsion-coated or its uncoated side, the object-glass is to occupy two different positions with reference to the optic axis. To this end, its support 55 integral with or rigidly secured to the general support 8 is provided with a tube 56 inside which is screwed the object-glass carrier 57. On this object-glass carrier is fitted a collar 58 through a screw 59 which may be unscrewed for preliminary adjustment (Figs. 7 and 9). This collar 58 is provided with an elongated notch 61 cooperating with a stationary stop 62. When either of the ends of the notch 61 abuts against the stop 62, they define either of two axial positions of the object-glass. The angular length of the notch 61 corresponds to the required travel of the object-glass between two correct focusing positions. These focusings are thus performed very simply and directly without any hesitation merely by acting on the lever 63 integral with the collar 58.

In order that the reading line may be really perpendicular to the sound record of the film to be projected it is necessary to provide an angular adjustment round the optic axis. To this end the tube 56 may rotate in its support 55 and carries a vertical slot 64 engaged by a projection 65 carried excentrically by the end of a screw 66. A stop formed by the spigot 67 holds the screw 66 in place. It is apparent that the rotation of the screw 66 will cause the displacement towards the right or towards the left of the eccentric projection 65 and thereby a rotation of the tube 56 with reference to the support 55. The tube 56 is held vertically by means of a screw 68 engaging the horizontal slot or recess 69.

Set screws 70 and 71 (Fig. 1) carried by lugs on the support 8 allow the tube 56 to be held firmly after all the adjustments have been executed.

What I claim is:

1. In a projecting machine for kinematographic sound films, a removable sound projector unit including a hollow perforated support adapted to be removably secured to the machine, a photoelectric cell housed inside said support in front of the perforation therein, an incurved channeled and slotted part carried on the outside of the support with its concavity turned towards the latter and through which the film is adapted to pass in front of the cell, the slot in said part registering with the perforation in the support, means carried by the support for yieldingly pressing the film in the channelled part, a pulley rotatably carried by the support on the side thereof and over which the film is adapted to pass and means carried by the support on the outside of the slot in the channelled part for focusing light on to the film as it passes in front of said slot.

2. In a projecting machine for kinematographic sound films, a removable sound projector unit including a hollow perforated support adapted to be removably secured to the machine, a photoelectric cell housed inside said support, in front of the perforation therein an incurved channelled and slotted part carried on the outside of the support with its concavity turned towards the latter and through which the film is adapted to pass in front of the cell, the slot in said part registering with the perforation in the support, means carried by the support for yieldingly pressing the film in the channelled part, a spindle rigidly secured to the support, a ball bearing carried by the spindle, a pulley for the film rotatably carried by the spindle, a flywheel fitted over the ball bearing and adapted to rotate integrally with the pulley and means carried by the support on the outside of the slot in the channelled part for focusing light on to the film as it passes in front of said slot.

3. In a projecting machine for kinematographic sound films, a removable sound projector unit including a hollow perforated support adapted to be removably secured to the machine, a photoelectric cell housed inside said support in front of the perforation therein, an incurved channelled and slotted part carried on the outside of the support with its concavity turned towards the latter and through which the film is adapted to pass in front of the cell, the slot in said part registering with the perforation in the support, a shoe adapted to press the film in the channelled part, a part yieldingly carrying said shoe and removably carried by the support, means for rocking said part and moving said shoe temporarily away from the channel, a pulley rotatably carried by the support on the side thereof and over which the film is adapted to pass and means carried by the support on the outside of the slot in the channelled part for focusing light on to the film as it passes in front of said slot.

4. In a projecting machine for kinematographic sound films, a removable sound projector unit including a hollow perforated support adapted to be removably secured to the machine, a photoelectric cell housed inside said support, in front of the perforation therein, an incurved channelled and slotted part carried on the outside of the support with its concavity turned towards the latter and through which the film is adapted to pass in front of the cell, the slot in said part registering with the perforation in the support, a partially threaded spindle, a nut screwed over said spindle for holding same against the channelled part, a washer rotatably fitted over the spindle, a lever integral with the washer, means for yieldingly connecting the lever with the nut, a ring rotatably fitted over the spindle behind the washer, means for preventing any relative rotation of the ring and washer, a second ring fitted over the first ring, means for preventing any relative rotation between the two rings, means for yieldingly interengaging the washer and first ring, an arm carried by the second ring, a shoe yieldingly carried by said arm and adapted to yieldingly press the film in the channelled part, a pulley rotatably carried by the support on the side thereof and over which the film is adapted to pass and means carried by the support on the outside of the slot in the channelled part for focusing light on to the film as it passes in front of said slot.

5. In a projecting machine for kinematographic sound films, a removable sound projector unit including a hollow perforated support adapted to be removably secured to the machine, a photoelectric cell housed inside said support, in front of the perforation therein an incurved channelled and slotted part carried on the outside of the support with its concavity turned towards the latter and through which the film is adapted to pass in front of the cell, the slot in said part registering with the perforation in the support, means carried by the support for yieldingly pressing the film in the channelled part, a pulley rotatably carried by the support on the side thereof and over which the film is adapted to pass, and means carried by the support on the outside of the slot in the channelled part for focusing light on to the film as it passes in front of said slot, and means for giving said focusing means two well determined positions with reference to the slot in the channelled part corresponding respectively to the cases where the unimpressed and the impressed sides of the film are in contact with the channelled part.

6. In a projecting machine for kinematographic sound films, a removable sound projector unit including a hollow perforated support adapted to be removably secured to the machine, a photoelectric cell housed inside said support, in front of the perforation therein, an incurved channelled and slotted part carried on the outside of the support with its concavity turned towards the latter and through which the film is adapted to pass in front of the cell, the slot in said part registering with the perforation in the support, means carried by the support for yieldably pressing the film in the channelled part, a pulley rotatably carried by the support on the side thereof and over which the film is adapted to pass, a partly threaded tube rigidly carried by the support on the outside of the slot in the channelled part, a second threaded tube screwed into the first tube, optic means carried by the second tube for focusing light on the film as it passes in front of said slot, a collar formed on the second tube and means for holding the second tube in either of two predetermined angular positions with reference to the longitudinal axis of the tube.

ANDRÉ LÉON VICTOR CLÉMENT DEBRIE.